United States Patent
Hall et al.

(10) Patent No.: US 9,579,998 B2
(45) Date of Patent: Feb. 28, 2017

(54) FLEXIBLE VEHICLE SEAT

(71) Applicant: Ford Global Technologies, LLC, Dearborn, MI (US)

(72) Inventors: Amber LaVerne Hall, Oak Park, MI (US); Michael Kolich, Windsor (CA); Keith Allen Godin, Dearborn, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/598,448

(22) Filed: Jan. 16, 2015

(65) Prior Publication Data

US 2015/0126916 A1    May 7, 2015

Related U.S. Application Data

(63) Continuation-in-part of application No. 13/951,174, filed on Jul. 25, 2013.

(51) Int. Cl.
*B60N 2/24* (2006.01)
*B60N 2/44* (2006.01)
*A61H 9/00* (2006.01)

(52) U.S. Cl.
CPC ........... *B60N 2/448* (2013.01); *A61H 9/0078* (2013.01); *B60N 2/4415* (2013.01); *A61H 2201/0149* (2013.01); *A61H 2201/5007* (2013.01); *A61H 2203/0431* (2013.01); *A61H 2205/081* (2013.01); *A61H 2205/086* (2013.01)

(58) Field of Classification Search
None
See application file for complete search history.

(56) References Cited

U.S. PATENT DOCUMENTS

| | | | |
|---|---|---|---|
| 4,629,253 A | 12/1986 | Williams | |
| 5,096,529 A | 3/1992 | Baker | |
| 5,658,050 A * | 8/1997 | Lorbiecki | B60N 2/4415 |
| | | | 137/625.44 |
| 5,975,629 A | 11/1999 | Lorbiecki | |

(Continued)

FOREIGN PATENT DOCUMENTS

| | | | |
|---|---|---|---|
| DE | 102004037069 | 4/2005 | |
| DE | EP 1839932 A2 * | 10/2007 | ............... B60N 2/00 |

(Continued)

*Primary Examiner* — Truc M Do
*Assistant Examiner* — Jess Whittington
(74) *Attorney, Agent, or Firm* — Vichit Chea; Price Heneveld LLP

(57) ABSTRACT

A method for selecting and controlling massage functions of a motor vehicle seat having a control system comprising the steps of: switching the system to a selection mode and starting the selection mode; providing a menu list having options for querying the user's requirements during the massage; selection of an option by the user and providing predefined responses to the respective query and selection of the response by the user and if necessary repeating the steps for further queries; and terminating the selection mode and automatically determining suitable massage settings on the basis of the user's selection and controlling the massage actuators in the motor vehicle seat on the basis of determined massage settings to perform the massage function.

7 Claims, 13 Drawing Sheets

(56) References Cited

U.S. PATENT DOCUMENTS

| | | | |
|---|---|---|---|
| 6,068,339 A | 5/2000 | Linzalone | |
| 6,203,105 B1* | 3/2001 | Rhodes, Jr. | A47C 4/54 |
| | | | 297/284.1 |
| 6,356,194 B1* | 3/2002 | Fukui | B60N 2/002 |
| | | | 180/271 |
| 7,152,920 B2 | 12/2006 | Sugiyama et al. | |
| 7,311,681 B1 | 12/2007 | Vaccarella | |
| 8,128,167 B2 | 3/2012 | Zhong et al. | |
| 2002/0145512 A1 | 10/2002 | Sleichter, III et al. | |
| 2003/0038517 A1* | 2/2003 | Moran | B60N 2/448 |
| | | | 297/284.3 |
| 2005/0203687 A1* | 9/2005 | Fortune | B60N 2/002 |
| | | | 701/45 |
| 2006/0155429 A1* | 7/2006 | Boone | B60K 35/00 |
| | | | 701/1 |
| 2010/0286867 A1* | 11/2010 | Bergholz | B60K 35/00 |
| | | | 701/36 |
| 2011/0055720 A1* | 3/2011 | Potter | G06F 3/017 |
| | | | 715/747 |
| 2012/0032478 A1 | 2/2012 | Friderich et al. | |
| 2012/0280554 A1* | 11/2012 | Brncick | B60N 2/66 |
| | | | 297/452.41 |
| 2013/0062921 A1* | 3/2013 | Meyer | B60N 2/5685 |
| | | | 297/284.8 |
| 2014/0032043 A1 | 1/2014 | Line et al. | |

FOREIGN PATENT DOCUMENTS

| | | | |
|---|---|---|---|
| EP | 1839932 B1 * | 3/2006 | B60N 2/02 |
| EP | 1839932 | 12/2010 | |
| IT | EP 1447070 A1 * | 8/2004 | A61H 9/0078 |

\* cited by examiner

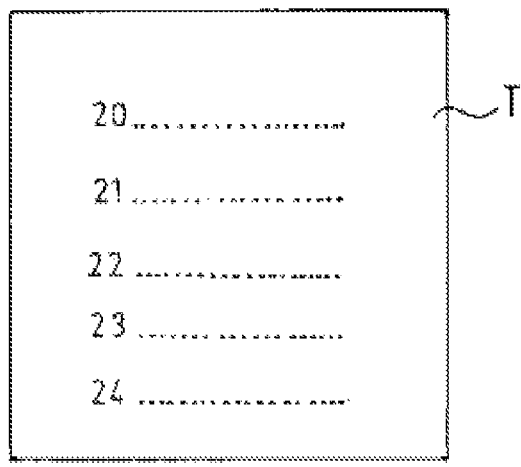
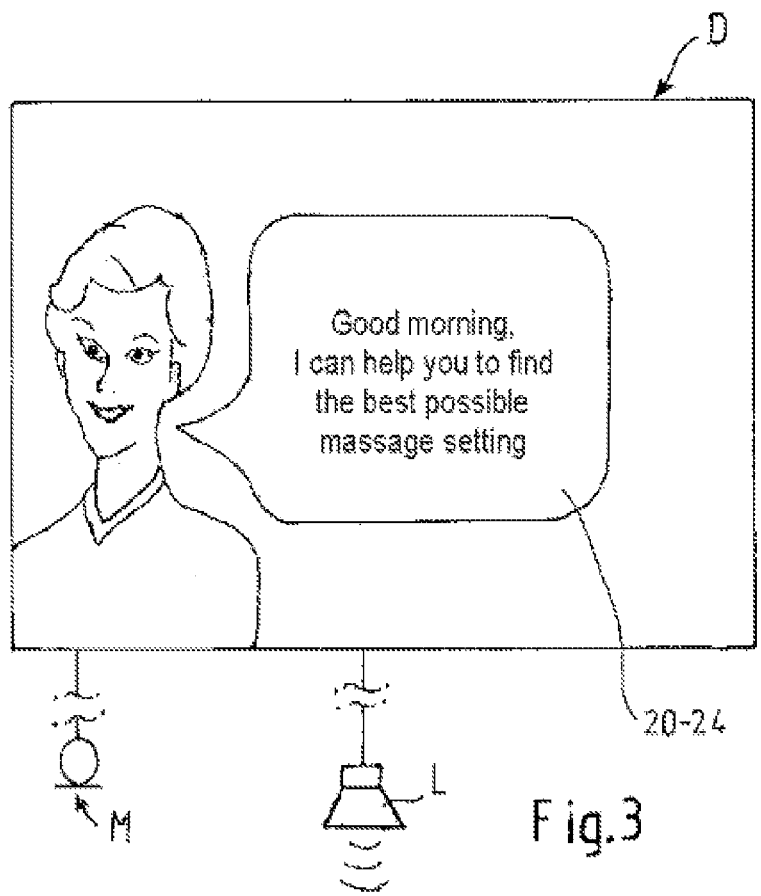

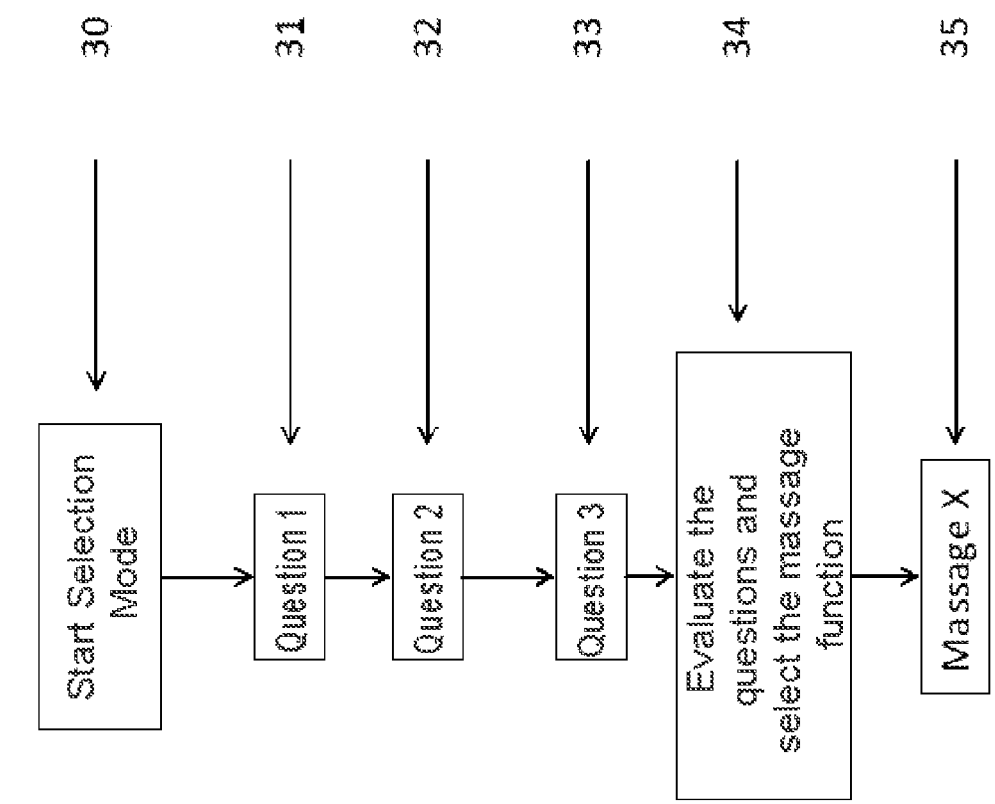

FLEXIBLE VEHICLE SEAT

CROSS-REFERENCE TO RELATED APPLICATION

This patent application is a continuation-in-part of U.S. patent application Ser. No. 13/951,174 filed on Jul. 25, 2013, entitled "METHOD AND APPARATUS FOR CONTROLLING MASSAGE FUNCTIONS OF A MOTOR VEHICLE SEAT," and is hereby incorporated herein by reference in its entirety.

FIELD OF THE INVENTION

The invention relates to a method for selecting and controlling massage functions of a motor vehicle seat and a corresponding device. The object of this invention is to provide a method for controlling and selecting massage functions of a motor vehicle seat, which method renders possible a simple and intuitive adjustment. This object is achieved by way of the method described herein.

BACKGROUND OF THE INVENTION

It is generally known to equip seats in motor vehicles with massage functions, for example for the lumbar supports and the actual seating surface. However, it is problematic for the user to operate the control system in a simple and intuitive manner, especially as the driver must perform the method whilst driving. It is usually necessary to reach a compromise between the variety of controls and the level of detail and also the level of simplicity and the model provided. Known systems are frequently complex and laborious to use, which results in the driver averting his or her attention in an undesired manner from steering the vehicle.

SUMMARY OF THE INVENTION

According to one aspect of the present invention, a method for selecting and controlling massage functions provided to a user in a motor vehicle seat having a control system includes the steps of switching the system to a selection mode and starting the selection mode. A menu list is provided having options for querying requirements of a user during a massage. Predefined responses are provided to the respective query. The response is selected by the user and if necessary the steps for further queries are repeated. The selection mode is terminated. Suitable massage settings are automatically determined on the basis of the selection of the user. Massage actuators are controlled in the motor vehicle seat on the basis of determined massage settings to perform the massage function.

According to another aspect of the present invention, a method for operating a massage assembly for a motor vehicle seat includes the steps of starting a selection mode and querying massage preferences of a user. Predefined responses are provided to each preference for selection by the user. The selection mode is terminated and suitable massage settings are provided based on selections of the user. Massage actuators are controlled in the motor vehicle seat based on the massage settings to perform a massage function.

According to yet another aspect of the present invention, a vehicle seating assembly massage device includes a seat and a seatback. An interface includes a display. A control is operably coupled to the display. Massage preferences are provided to a user by the display. The control provides predefined responses to each preference for selection by the user. Seat and seatback massage actuators are coupled to the control and are configured to receive instructions from the control to perform a massage function.

These and other aspects, objects, and features of the present invention will be understood and appreciated by those skilled in the art upon studying the following specification, claims, and appended drawings.

BRIEF DESCRIPTION OF THE DRAWINGS

Further features and details of the invention are evident from the following description of the drawing, in which:

FIG. 2 illustrates an exemplary menu for querying whether the user is suffering any pain;

FIG. 3 illustrates a query with the support of an avatar;

FIG. 4 illustrates a schematic flow diagram for selecting and controlling massage functions of the motor vehicle seat;

DETAILED DESCRIPTION OF EMBODIMENTS

Figure 1:
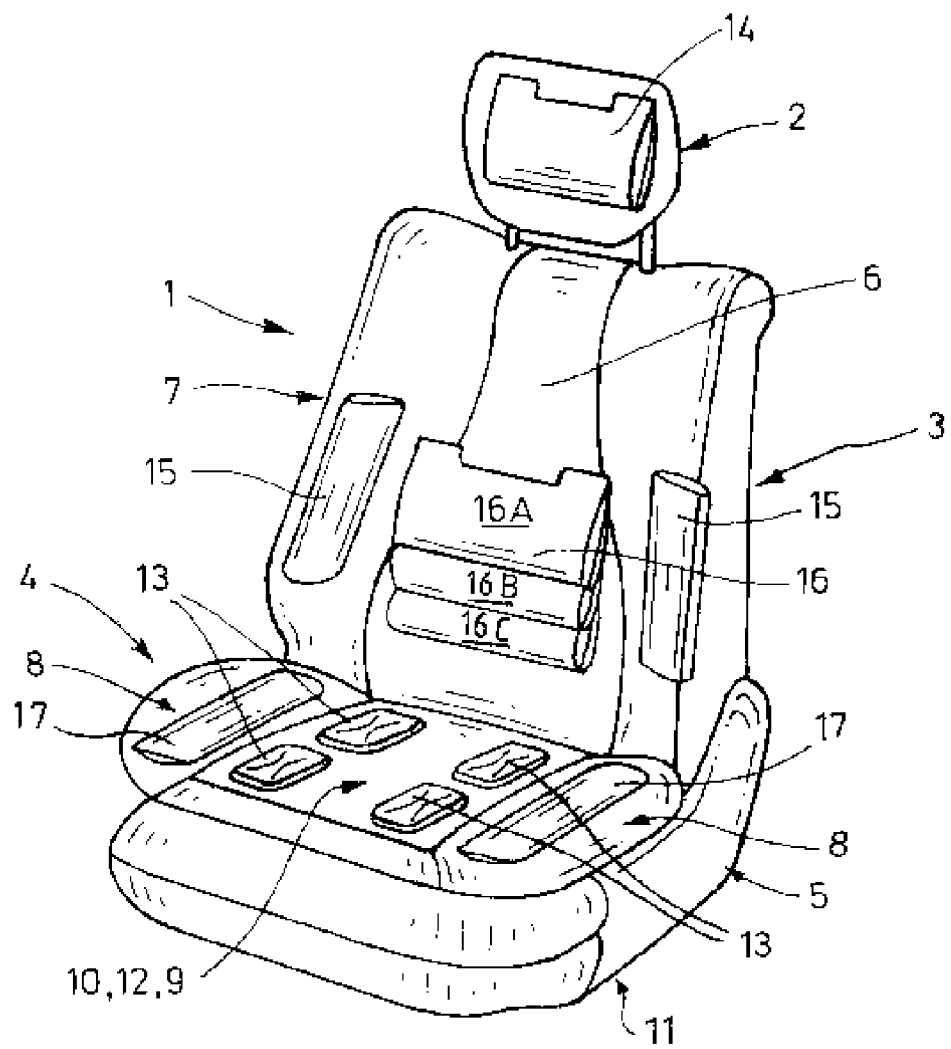
FIG. 1 illustrates a perspective and schematic view of a motor vehicle seat.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In accordance with the invention it has become known, that an extensive simplification of the selection method and intuitive operation can be achieved if, within the framework of the method for selecting and controlling massage functions massage functions of a motor vehicle seat that includes a control system, a menu list is provided in the selection mode, which menu list includes options for querying the user's requirements during the massage, the user selects an option and for this purpose the menu list displays predefined responses to the respective query and the response is selected by the user (from the responses provided). If necessary, these steps are repeated for further queries. Finally, the selection mode is terminated, suitable massage settings are automatically defined on the basis of the response selected by the user and the massage actuators in the motor vehicle seat are activated to perform the massage function on the basis of the specific massage settings. In other words, the user is purposefully consulted and can select from the options provided. A massage is defined on the basis of the user's responses and the actuators in the vehicle seat are correspondingly activated. As a consequence, the user is guided to the appropriate and desired setting of the massage functions.

In one embodiment, the options include queries relating to physical ailments and/or pains that can be alleviated by means of a massage. Predefined responses are provided in accordance with the invention. The predefined responses include a list of the ranges of the respective physical ailments and/or pains that can be alleviated. In one aspect of the invention, the user is initially queried to determine whether the user is in pain. As a response, a list appears that specifies back, neck, pelvis or buttock pains and/or stiffness or numbness etc. In addition, it is expedient if the options list includes queries relating to the physical characteristics (such as weight, age, height etc.) of the user. A list of ranges of the respective physical characteristics is in turn provided for the user to make a selection from the predefined responses. In addition, it is desired if the menu list includes the option for the user to select his or her desired massage characteristics and if the predefined responses include information relating to usual massage characteristics (a heavy massage, a gentle massage, more pressure on top or lower down etc.).

In another embodiment, interaction with the user (options, responses, etc.) is performed with the support of an avatar. An avatar is an artificial person or graphic representation of a real person in the virtual world, for example in a computer. The graphic representation exists to reduce the inhibition threshold of the interaction and to facilitate the interaction. The graphic representation can be supported and/or guided by speech while implementing and/or accepting the options and responses. A menu list is provided in an expedient manner, which menu list includes options for querying the user's requirements during the massage and provides the user with the facility to respond to the query. The menu list provides predefined responses to the respective query and to the selected response provided by the user and if necessary the menu list repeats the step for further queries using a display device and an operating element. It is contemplated that interface devices, such as an LCD display, a touch screen display, and a loudspeaker, can be used as a possible display device. 5-position buttons and touch screen displays and microphones have each proven to be possible operating elements. It is also feasible to control the system by way of so-called mobile phone apps (programs) by way of which the mobile phone is able to control the system remotely.

With reference to the embodiment generally illustrated in FIG. 1, reference numeral 1 generally designates a seat in accordance with the present invention, wherein the transparency renders a view of the interior of the seat possible. The seat 1 includes a head support 2, which head support is arranged at the top on a back rest 3, which back rest is in turn coupled to the actual seat 4 by way of a hinge joint 5 that can be adjusted. In this case, the seat 1 is supported by a sheet steel frame 11, which frame is arranged under the actual seating surface and is connected to the vehicle. The back rest 3 includes an overlay 6 that includes an approximately S-shaped longitudinal section, which overlay is anatomically formed for the back of the occupant and is delimited at the sides by protruding fins 7 that provide the occupant with lateral support. The actual seat 4 likewise includes an overlay 9 that defines the actual seating surface. Protruding fins 8 are also provided on the sides in this case, which fins provide the occupant with support, in particular as the vehicle negotiates bends. The overlay 9 is embodied from a foam block 10 formed from a suitable natural—and/or synthetic material, which can be upholstered using a suitable material such as leather. It is necessary for the overlay to include the conventional and known characteristics, such as to provide cushioning, to absorb shocks, to transport moisture etc. In addition it is possible to provide heating and/or cooling devices in the overlay.

A support plate 12 that is embodied from a stiff material is provided under the foam block 10, as can be easily recognized in FIG. 1. The support plate 12 in this case is arranged under the rear region of the seating surface, which is generally occupied by the buttocks of the occupant. An air cushion 13 is provided under the support plate 12 and above the frame 11, in other words between the support plate 12 and the frame 11, which air cushion by way of a controller, not illustrated, valves and compressor renders it possible to adjust and improve the shock absorbing characteristics of the seat by means of adjusting the air pressure even when the vehicle is travelling. The controller can automatically regulate the air pressure in the air cushion 13 after the data that is provided by the sensors regarding the driving situation and the occupant has been evaluated. A manual adjustment, input or intervention into the automatic control process is also feasible.

The seat 1 also includes further air cushions 15, 17, 16 and 14 in the fins 7 and 8, the overlay 6 and the head support 2, which air cushions are used to perform the massage and to adjust the contour. The air cushions can likewise be used and/or regulated by way of the previously mentioned controller. In addition in the event of a vehicle collision, the air cushions can be inflated and used as additional impact protection, in order to prevent the occupant making contact with the metal frame 11 of the seat. Four additional air cushions 13 are provided under the actual seat 9 between the support plate 12 and the frame 11. The air cushions are arranged in this case in such a manner, that they lie under the corners of the approximately rectangular seating surface. The four mutually independently controllable and inflatable air cushions 13 under the support plate 12 vertically position the support plate 12 making it possible to tilt the support plate 12 about two axes that extend parallel to the plane of the seat surface and that extend perpendicular relative to one other. As a consequence, the pelvis of the occupant can be tilted from the front towards the rear and from the rear towards the front. This is relaxing and is used, for example, during spinal gymnastics. It is particularly helpful to tilt the pelvis in this manner in order avoid back pain. This movement can be coupled with a tilting movement from left to right, so that the fatigue associated with the pelvic movement caused by the alternating periodic tensing and relaxing of muscles is avoided in a particularly efficient manner. As a consequence, it is clear that extremely different massage shapes, intensities and duration periods are possible by virtue of the programmed control of the air cushions and zones. By way of example, the method for selecting and controlling massage functions is described below with reference to FIGS. 2-4. An exemplary menu M to query the existence of pain and/or physical ailments having predefined responses for selection by the user using a touch screen display T of a motor vehicle dashboard is illustrated in FIG. 2.

In one embodiment, as illustrated in FIG. 2, pain and/or physical ailments in the lower back region 20, pain in the upper back region 21, tensing of back muscles 22, back stiffness 23 and numbness of the buttocks 24 are options listed for the user to make a selection by means of pressing and/or touching the corresponding response field. The computer in the massage control system ascertains the optimal massage for alleviating the pain with reference to the field that is selected by the user. For example, as noted above, the user may touch the display, provide verbal input, etc., and the air cushions 13 to 17 are controlled accordingly. A corresponding query that is supported by an avatar A on a display D is illustrated in FIG. 3, wherein the process of querying the physical ailments 20-24 is supported by speech by way of a loudspeaker L and the input is provided by way of a microphone M.

FIG. 4 is a schematic flow diagram of the method in accordance with the invention for selecting and controlling massage functions of the motor vehicle seat illustrated in FIG. 1 by way of the touch screen display T illustrated in FIG. 2. The selection mode is initially started in step 30 and then the first question is posed in the next step 31, for example a menu M is displayed on a touch screen display T of a motor vehicle dashboard for querying the existence of pain and/or physical ailments with predefined responses for selection by the user. In step 31, pain and/or physical ailments in the lower back region 20, pain in the upper back region 21, tensing of back muscles 22, back stiffness 23 and numbness of the buttocks 24 are listed for the user to make a selection by means of pressing and/or touching the corresponding response field. The response is fixed in step 31 by the user touching the screen display to select the field. In the steps 32 and 33, a number of questions follow in a similar manner, in this example there are three more questions. Finally, in step 34, the optimal massage for alleviating pain is defined by the computer in the massage control system (x). For this purpose, a database of comparative values is consulted, the values are compared with the user's responses and subsequently the optimal massage function is selected. In step 35, the air cushions 13 to 17 are controlled accordingly.

Figure 5:
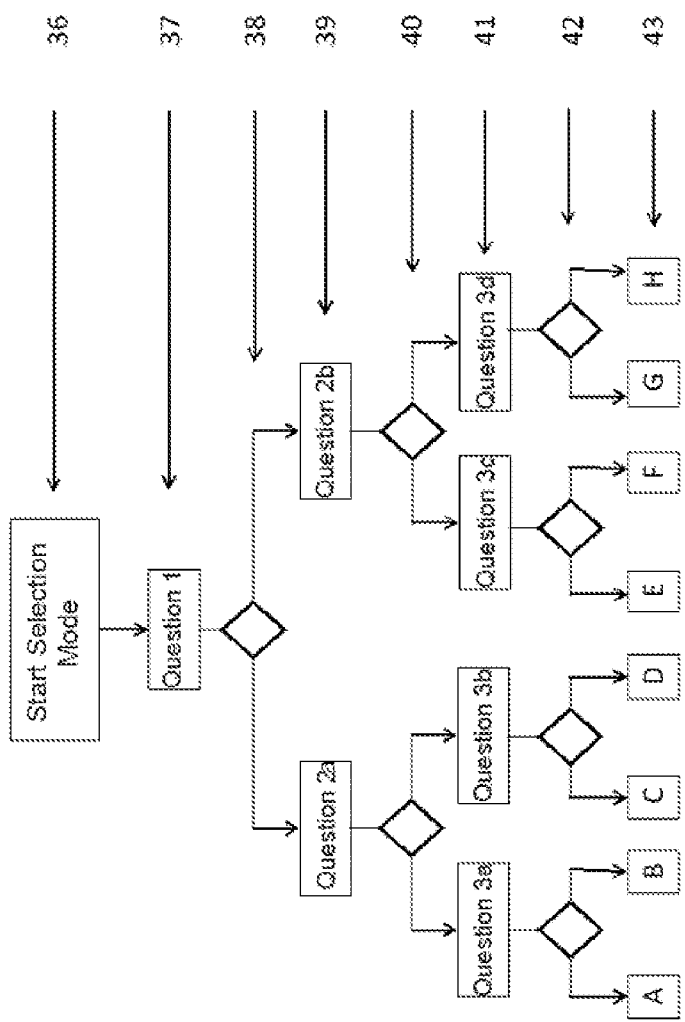
FIG. 5 illustrates a further schematic flow diagram for selecting and controlling massage functions of the motor vehicle seat.

FIG. 5 is a schematic flow diagram of the method in accordance with the invention for selection and control of massage functions of the motor vehicle seat in FIG. 1 with reference to the touch screen display T illustrated in FIG. 2. The selection mode is initially started in step 36 and then the first question is posed in the next step 37, for example a menu M is displayed on a touch screen display T of a motor vehicle dashboard for querying the existence of pain and/or physical ailments with predefined responses for selection by the user. In step 37 pain and/or physical ailments in the lower back region 20, pain in the upper back region 21, tensing of back muscles 22, back stiffness 23 and numbness of the buttocks 24 are listed for the user to make a selection by means of pressing and/or touching the corresponding response field. The response is fixed in step 38 by the user touching the screen display to select the field. A second question is posed by the computer of the massage control system in step 39 depending upon the response to the question in step 38. A response can also be given here in a similar manner to that in step 38, whereupon further questions can follow. In FIG. 5, a third question is then posed in step 41. In step 43, the optimal massage for alleviating the ailments of the user and/or to allow the user to rest is determined according to the response in step 42 to the last question. The air cushions 13 to 17 are then controlled according to the selected massage.

Figure 6:
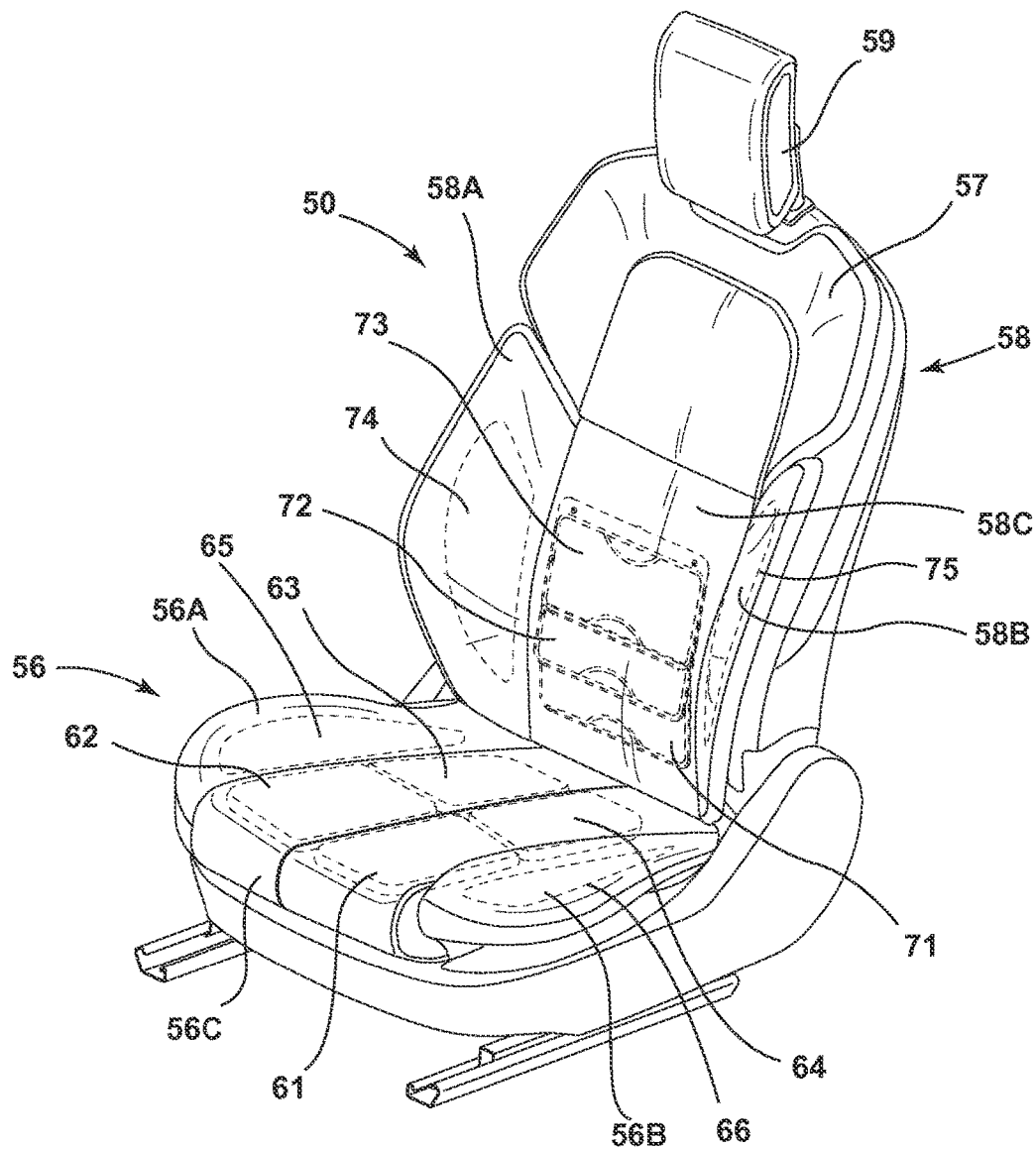
FIG. 6 is a perspective view of a vehicle seat according to another embodiment having a plurality of air bladders disposed therein.

Referring now to FIG. 6, another embodiment of a vehicle seat 50 is shown. The vehicle seat 50 generally includes a substantially horizontal seat portion 56 and a seatback 58 having a headrest assembly 59 disposed on an upper portion thereof. It is contemplated that the seatback 58 is a pivoting member configured for pivotal movement relative to the seat portion 56. The seat portion 56 includes a central portion 56C having protruding fins 56A, 56B on opposite sides thereof. The protruding fins 56A, 56B are generally disposed at an inward angle towards the central portion 56C of the seat portion 56 and are configured to provide support for a vehicle occupant while a vehicle, in which the vehicle seat 50 is disposed, is in motion. Similarly, the seatback 58 includes protruding fins 58A, 58B which are also configured to support a vehicle occupant and are generally angled towards a central portion 58C of the seatback 58. In FIG. 6, the vehicle seat 50 is shown having a cover 57 which is contemplated to be comprised of a suitable natural or synthetic material, or any combination thereof, used to generally cover or upholster the vehicle seat 50. As shown in phantom in FIG. 6, the vehicle seat 50 includes a series of air bladders 61-64 disposed in central portion 56C of the seat portion 56, as well as a series of air bladders 71-73 disposed in the central portion 58C of the seatback 58. Further, air bladders 65, 66 are shown disposed in protruding fins 56A, 56B of seat portion 56, and air bladders 74, 75 are shown disposed in protruding fins 58A, 58B of seatback 58. The air bladders 61-66, 71-75 are configured to fill with air to a select inflation level in response to an input by a vehicle occupant relative to a select comfort setting chosen by the vehicle occupant, as described above. In this way, the air bladders 61-66, 71-75 are each configured to selectively inflate, semi-inflate, or deflate relative to a specific comfort setting selected by the vehicle occupant to provide a customized support setting.

Figure 7A:
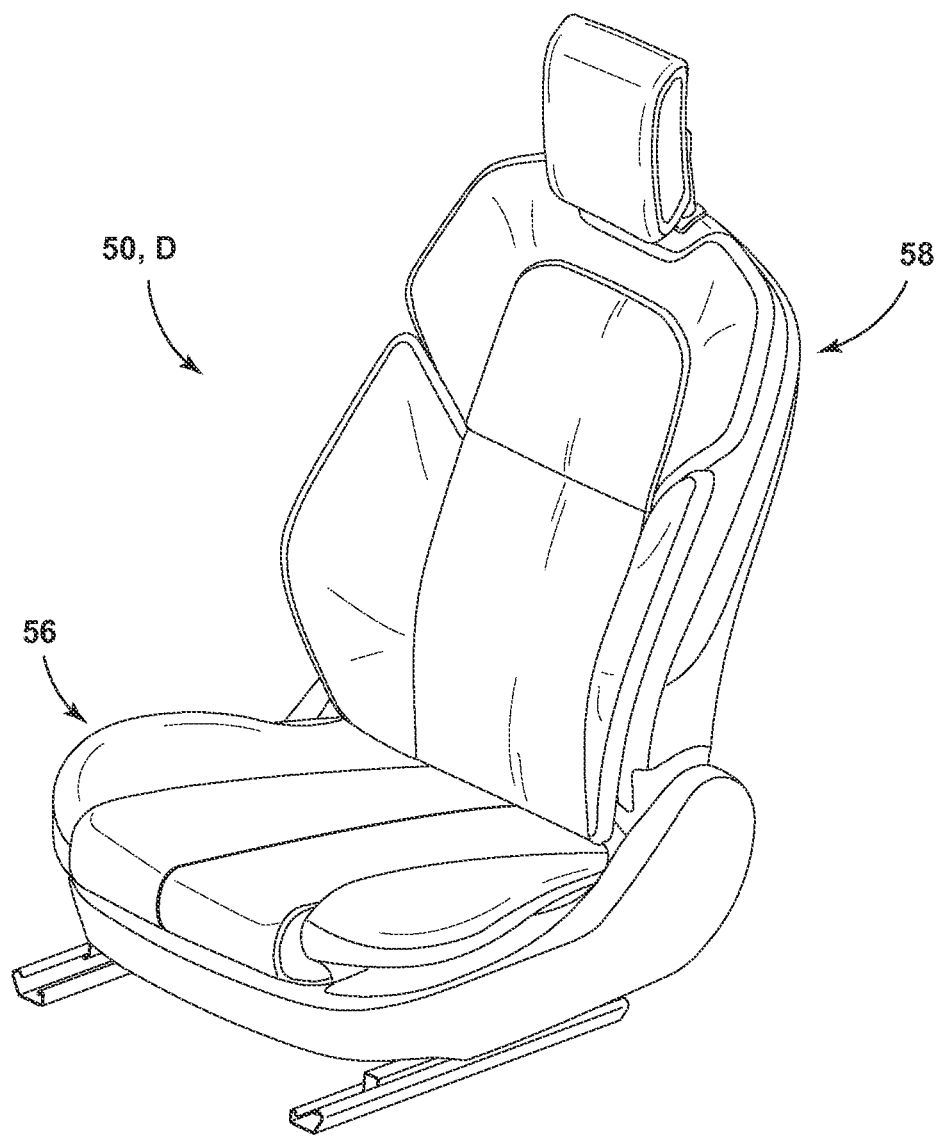
FIGS. 7A-7C are perspective views of the vehicle seat of FIG. 6 shown at various inflation levels.
Figure 7B:
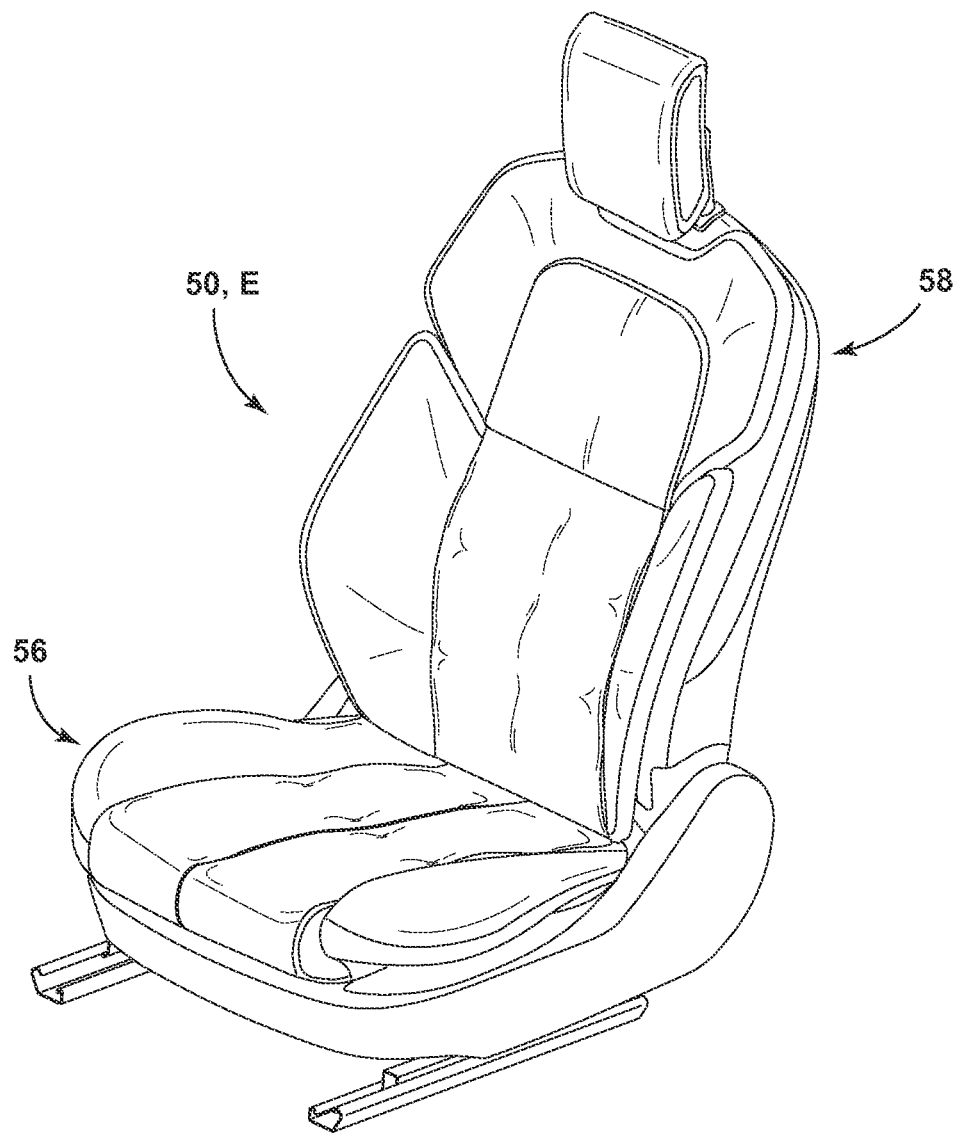
Figure 7C:
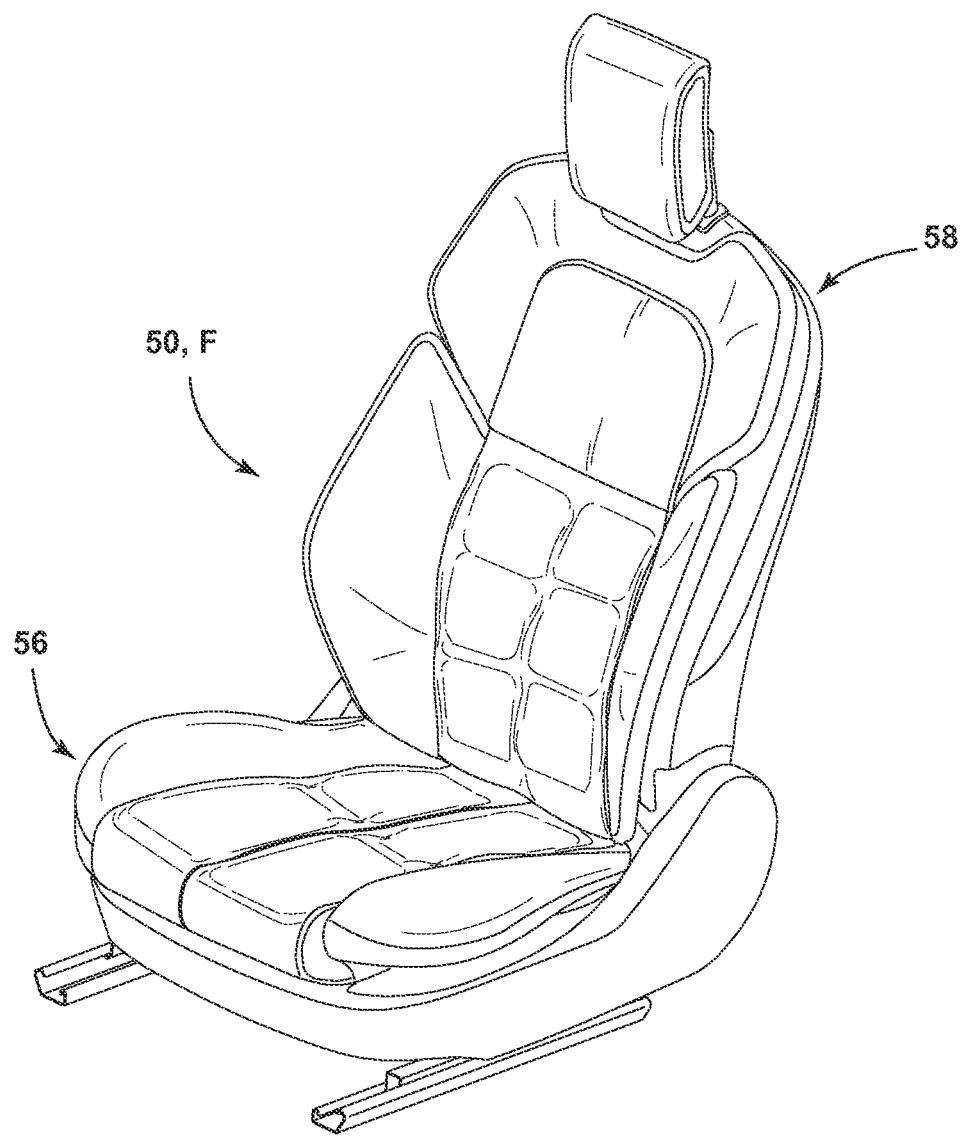

Referring now to FIGS. 7A-7C, the vehicle seat 50 is shown in a deflated or unfilled inflation level D (FIG. 7A), a semi-inflated inflation level E (FIG. 7B), and a fully inflated inflation level F (FIG. 7C). In the fully inflated inflation level F (FIG. 7C), the air bladders 61-66, 71-75 have been filled to a maximum capacity to provide firm support for a vehicle occupant. In the semi-inflated inflation level E (FIG. 7B), the air bladders 61-66, 71-75 have been semi-filled with air to provide a customized cushioned support for a vehicle occupant. In the fully deflated or unfilled inflation level D shown in FIG. 7A, the vehicle seat 50 is generally supported by a cushion material disposed in the seat portion 56 and the seatback 58, over which the air bladders 61-66, 71-75 generally reside. While the air bladders 61-66, 71-75 are covered by cover 57 (FIG. 6) in FIGS. 7A-7C, their location is contemplated to be the same as shown in FIG. 6 and made apparent in FIGS. 7B and 7C as the air bladders 61-66, 71-75 are semi-filled and fully filled with air, respectively.

With further reference to FIG. 7B, the air bladders 61-66, 71-75 are in the semi-inflated inflation level E. At this inflation level E, the series of air bladders 61-64 disposed in central portion 56C of the seat portion 56 provide for a cushioning or pillow effect for a vehicle occupant, as seated thereon.

Figure 8:
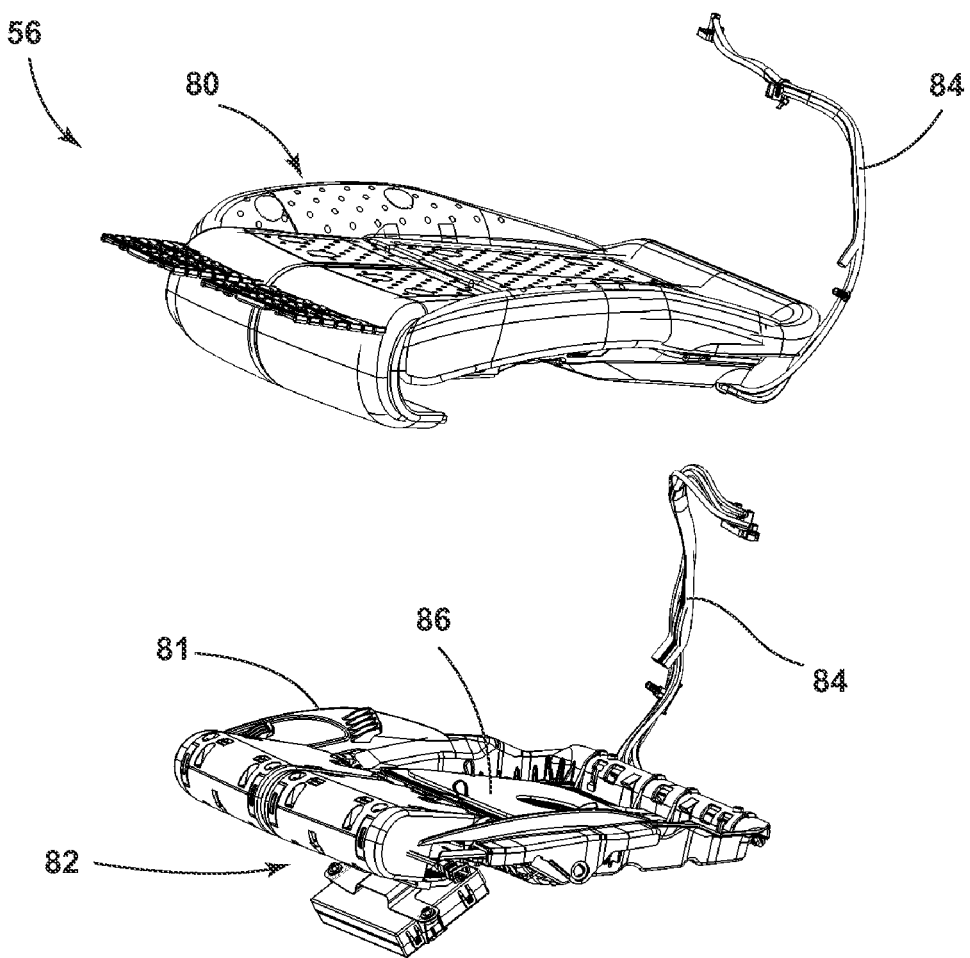
FIG. 8 is an exploded perspective view of a seat portion of the vehicle seat of FIG. 6 having a cover removed.

Referring now to FIG. 8, the seat portion 56 is shown having a cushion material 80 which generally supports the vehicle occupant in use. The cushion material 80 is generally supported on a metal frame 81 similar to metal frame 11 described above. It is further contemplated that the seatback portion 58 (FIG. 6) also includes a similar arrangement of metal frame components having cushion material supported thereon. The air bladders 61-66 (FIG. 2) are generally supported on the cushion material 80 and further covered by the cover 57 (FIG. 2) in assembly. An inflation system 82 includes air passageways 84 for inflating air bladders 71-75 to any one of the inflation levels D-F noted above. The inflation system 82 further includes air passageways 85 (FIG. 10) for inflating air bladders 61-66 to any one of the inflation levels D-F noted above. The seat portion 56 further includes a support plate 86 which is generally supported on the air bladders 61-66 (FIG. 2) in assembly. It is contemplated that the air bladders 61-66 are each selectively inflatable by way of a controller interfaced with the touch screen display T described above for adjusting a position of the support plate 86, as further described below.

Figure 9:
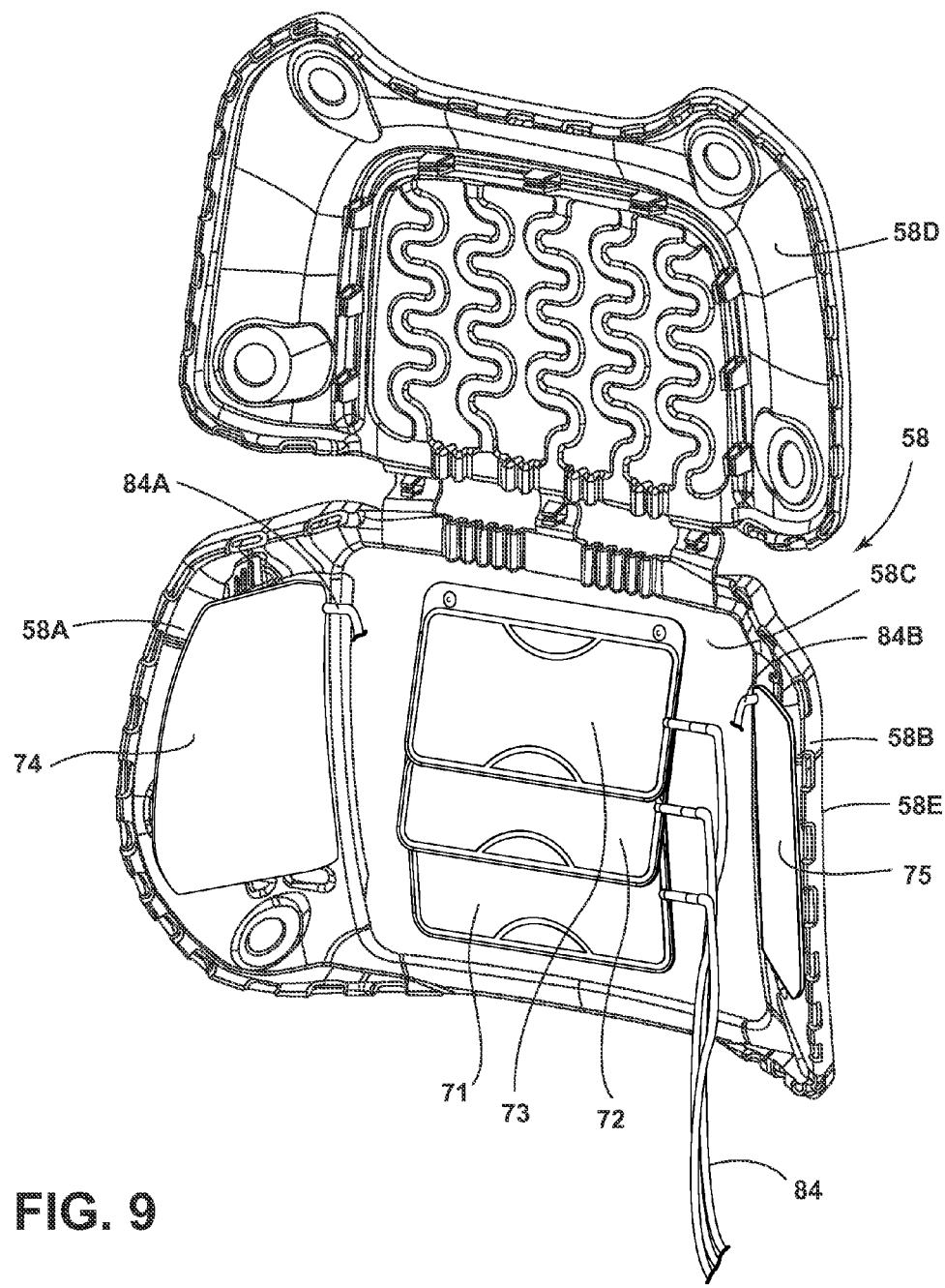
FIG. 9 is a perspective view of a seatback portion of the vehicle seat of FIG. 6 having a cover removed.
Figure 10:
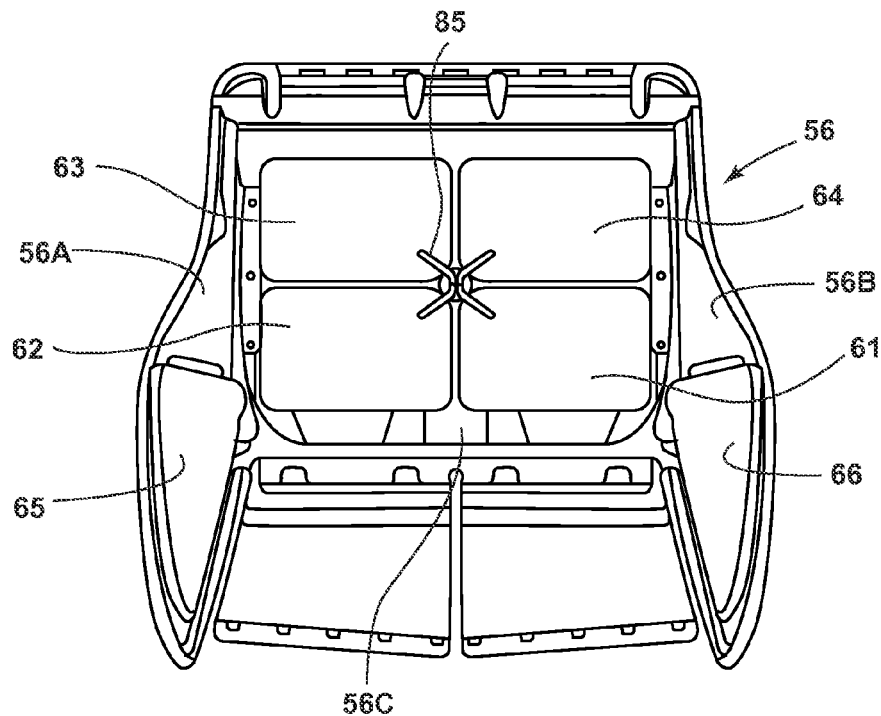
FIG. 10 is a top plan view of the seat portion of FIG. 8.
Figure 11:
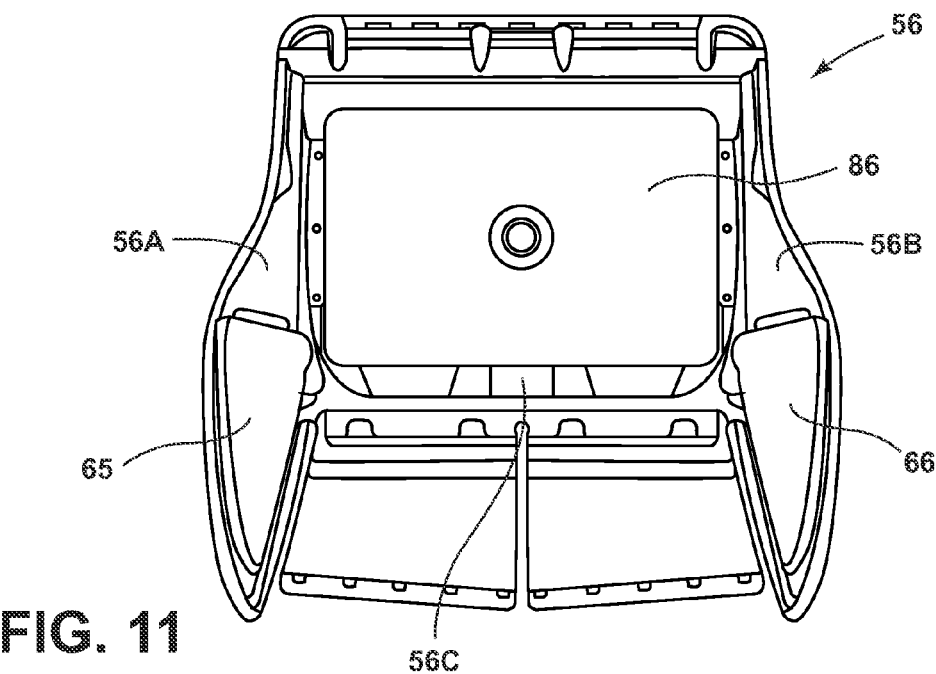
FIG. 11 is a top plan view of the seat portion of FIG. 8 with a support plate.

Referring now to FIG. 9, the seatback portion 58 is shown having a flexible upper portion 58D and air bladders 71-75 disposed in a lower portion 58E of the seatback 58. As further shown in FIG. 9, air passageways 84 are shown as providing inflation routes for air bladders 71-73, and it is further contemplated that the air passageways 84 also provide inflation routes for air bladders 74, 75 shown at 84A and 84B. Similarly, as shown in FIG. 10, air passageways 85 provide inflation routes for air bladders 61-64 as disposed in the seat portion 56. Thus, it is contemplated that any one of the individual air bladders 61-66 of the seat portion 56 and air bladders 71-75 of the seatback 58 can be selectively and individually inflated to an inflation level as generally represented in FIG. 7A-7C. Thus, each air bladder's inflation level is separately controlled by the controller to fill the air bladders 61-66, 71-75 to a predetermined inflation level. The semi-inflated inflation level E, shown in FIG. 7B, is illustrative of an infinitely variable semi-inflated inflation level that lies between the deflated inflation level D (FIG. 7A) and the fully inflated inflation level F (FIG. 7C).

Figure 12B:
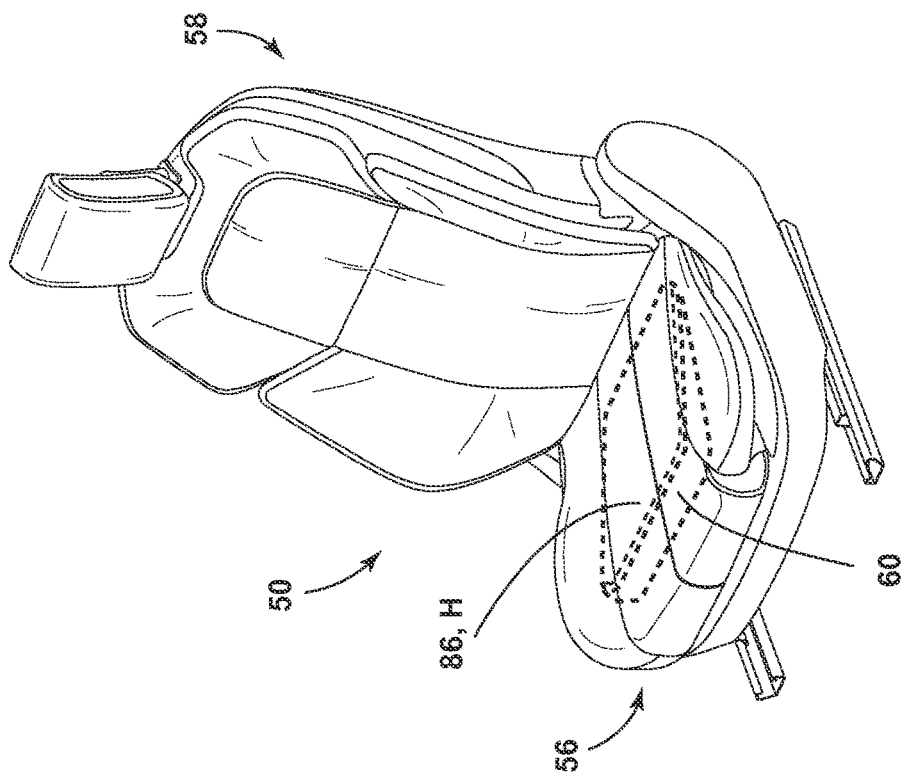
FIGS. 12A-12B are perspective views of the vehicle seat of FIG. 6 showing the support plate at various angles.
Figure 12A:
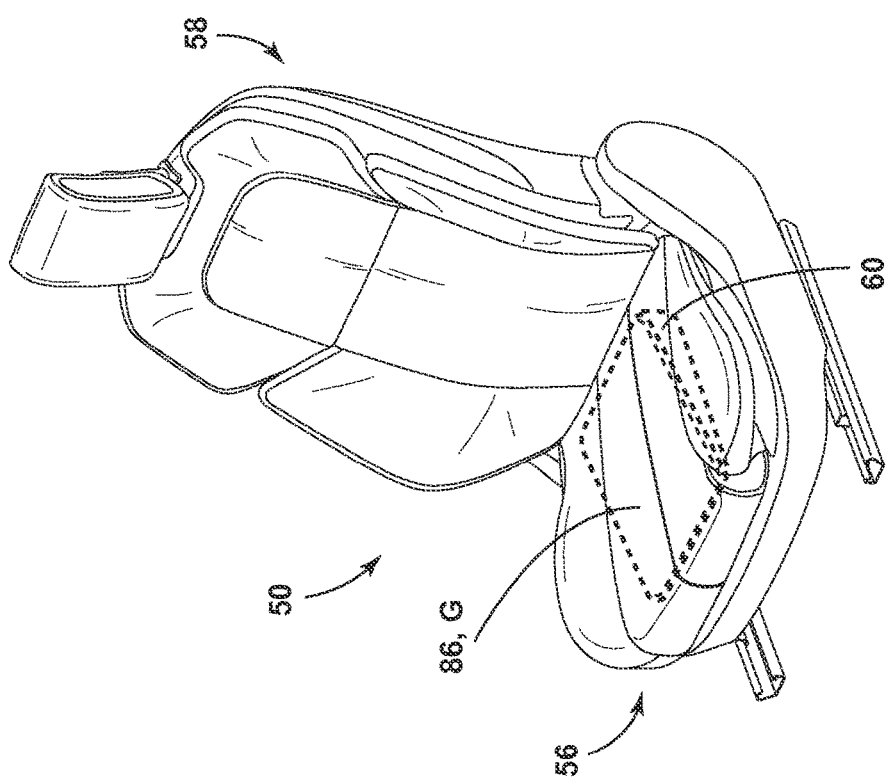

Referring now to FIG. 10, the support plate 86 is shown as a generally planar support plate which is supported by the individual air bladders 61-64 (FIG. 10). Referring now to FIGS. 12A, 12B, the support plate 86 is shown in various positions as dictated by the air bladders 61-64 within the seat portion 56 of the vehicle seat 50. With specific reference to FIG. 12A, the support plate 86 is shown in a forward tilt position G as supported by the air bladders 60. As used herein, the reference numeral 60 generally indicates the air bladders 61-64 as arranged in FIG. 10 as a support for the support plate 86. With specific reference to FIG. 12B, the air bladders 60 are shown supporting the support plate 86 in a rearward tilt position H.

Figure 13B:
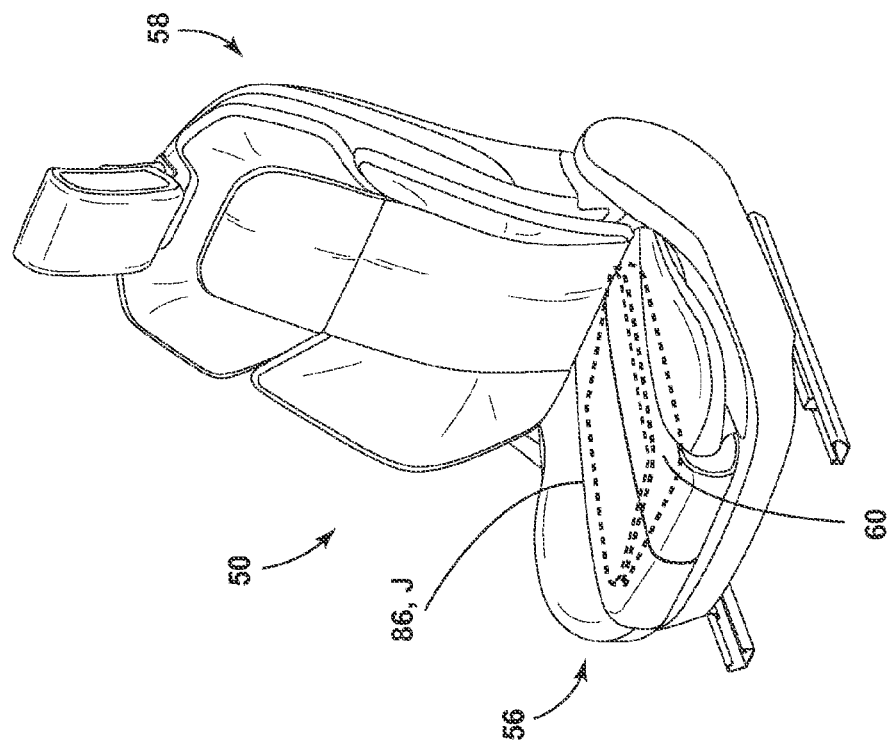
FIGS. 13A-13B are perspective views of the vehicle seat of FIG. 12A showing the support plate at various angles.
Figure 13A:
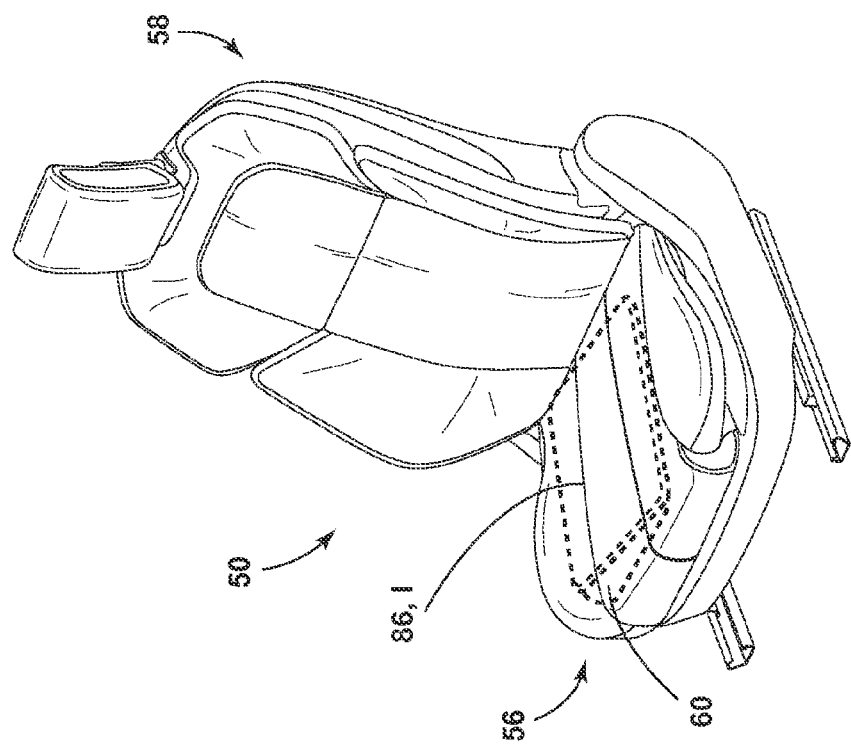

With reference to FIGS. 13A, 13B, the support plate 86 is shown supported by the air bladders 60 in various tilt positions. With specific reference to FIG. 13A, the support plate 86 is shown in a left tilt position I. With specific reference to FIG. 13B, the support plate 86 is shown supported by the air bladders 60 in a right tilt position J. Thus, the four independently controllable and inflatable air bladders 61-64 under the support plate 86 position the support plate 86 making it possible to tilt the support plate 86 about two axes that extend parallel to the plane of the seat surface and that extend perpendicular relative to one other. As a consequence, the pelvis of the vehicle occupant can be tilted from the front towards the rear and from the rear towards the front (FIGS. 12A, 12B). This movement can be coupled with a tilting movement from left to right (FIGS. 13A, 13B).

The vehicle seat 50, as shown in FIG. 8, includes a cushion material 80 that is generally made of a foam base which is covered in a fabric 57 (FIG. 6). Generally, a standard vehicle seat, without an air bladder inflation system, may be somewhat rigid using only the cushion material for support. A standard vehicle seat does not visibly flex as a user changes position. Due to the rigid nature of a standard vehicle seat, the weight of the user is not evenly distributed across the seat. Thus, the vehicle seat 50, as shown in FIG. 6, is capable of being inflated to a partial inflation setting, such as setting E shown in FIG. 7B. The air bladders 61-66, 71-75 are much more flexible than at the semi-inflated inflation level E (FIG. 7B) as compared to the fully inflated air bladders 61-66, 71-75 at the fully-inflated inflation level F (FIG. 7C). The partially inflated air bladders 61-66, 71-75 allow for the cushion material 80 to flex as the user readjusts in the vehicle seat 50 to redistribute weight after being in one position for a long period of time.

The partially inflated air bladders 61-64, in particular, provide a pillow-like effect to the vehicle seat 50 that is similar to a leather couch used in a living room. Further, with the support plate 86 in place, the seat portion 56 of the vehicle seat 50 is given a uniform support across the partially inflated air bladders 61-64 to accommodate the support plate 86 positions G-J, as shown in FIGS. 12A-12B and 13A-13B.

Further, the air bladders 61-66, 71-75 are configured to inflate to the fully inflated inflation level F shown in FIG. 7C, when a collision event is sensed by the controller. Thus, it is contemplated that the controller used to control the inflation levels of the air bladders 61-66, 71-75 may receive a signal from an on-board vehicle computer to indicate that a collision event has occurred. Based on this signal, the controller can inflate the air bladders 61-66, 71-75 to an appropriate inflation level, such that the air bladders 61-66, 71-75 serve as additional impact protection, in order to prevent the vehicle occupant from making contact with the metal frame 81 (FIG. 8) of the vehicle seat 50.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat, comprising:
    seat and seatback portions, each having a metal frame with a cushion material disposed thereon;
    air bladders disposed in the seat portion over the cushion material;
    a controller configured to individually control an inflation level of each of the air bladders between deflated, semi-inflated and fully inflated levels, wherein the air bladders inflate to the fully inflated level in response to a collision event detected by the controller; and
    an inflation system positioned under the seat portion, the inflation system including a plurality of dedicated air passageways positioned between the air bladders of the seat portion, and wherein the plurality of dedicated air passageways extend from the inflation system and are centrally bundled to extend vertically through the metal frame and through a central area between the air bladders of the seat portion to selectively and independently deliver air to each of the air bladders via the central area between the air bladders of the seat portion.

2. The vehicle seat of claim 1, including:
    air bladders disposed in the seatback portion, wherein the cushion material is positioned between the air bladders in the seat back portion and the metal frame of the seatback portion.

3. The vehicle seat of claim 2, wherein each of the air bladders disposed in the seat portion and the air bladders disposed in the seatback portion are separately controlled by the controller.

4. The vehicle seat of claim 1, including:
    a support plate supported on the air bladders disposed in the seat portion, wherein the air bladders of the seat portion are disposed between the support plate and the cushion material of the metal frame of the seat portion, and wherein the plurality of air passageways bundled at the central portion are positioned under the support plate.

5. The vehicle seat of claim 4, wherein each air bladder of the plurality of air bladders disposed in the seat portion are separately controlled by the controller to adjust a position of the support plate.

6. The vehicle seat of claim 5, wherein the support plate is supported on the plurality of air bladders between a forward tilt position, a rearward tilt position, a right tilt position and a left tilt position.

7. The vehicle seat of claim 6, wherein the support plate is an at least partially planar support plate.

* * * * *